Jan. 17, 1961   T. W. GLYNN   2,968,487
STIRRING APPARATUS FOR MOLTEN GLASS
Filed May 21, 1958   2 Sheets-Sheet 2
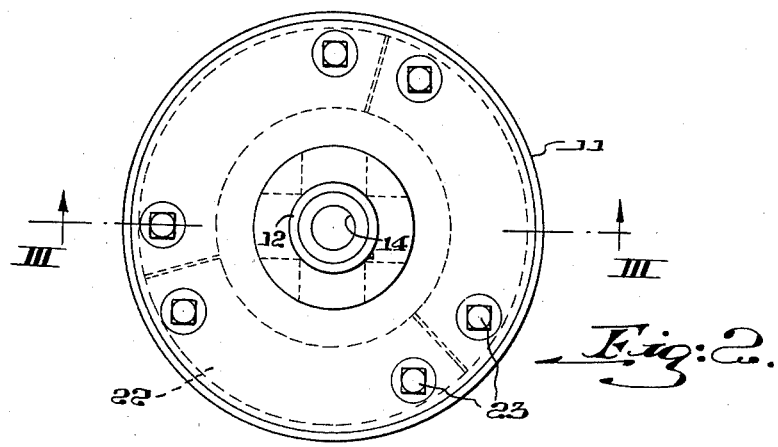
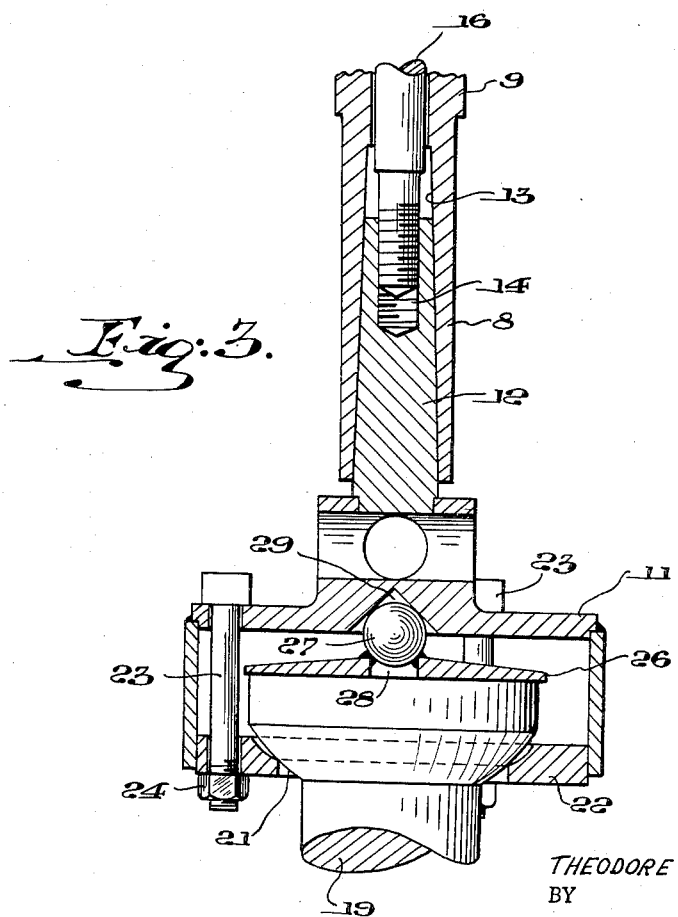
INVENTOR.
THEODORE W. GLYNN
BY
Brown, Critchlow, Flick & Peckham
ATTORNEYS.

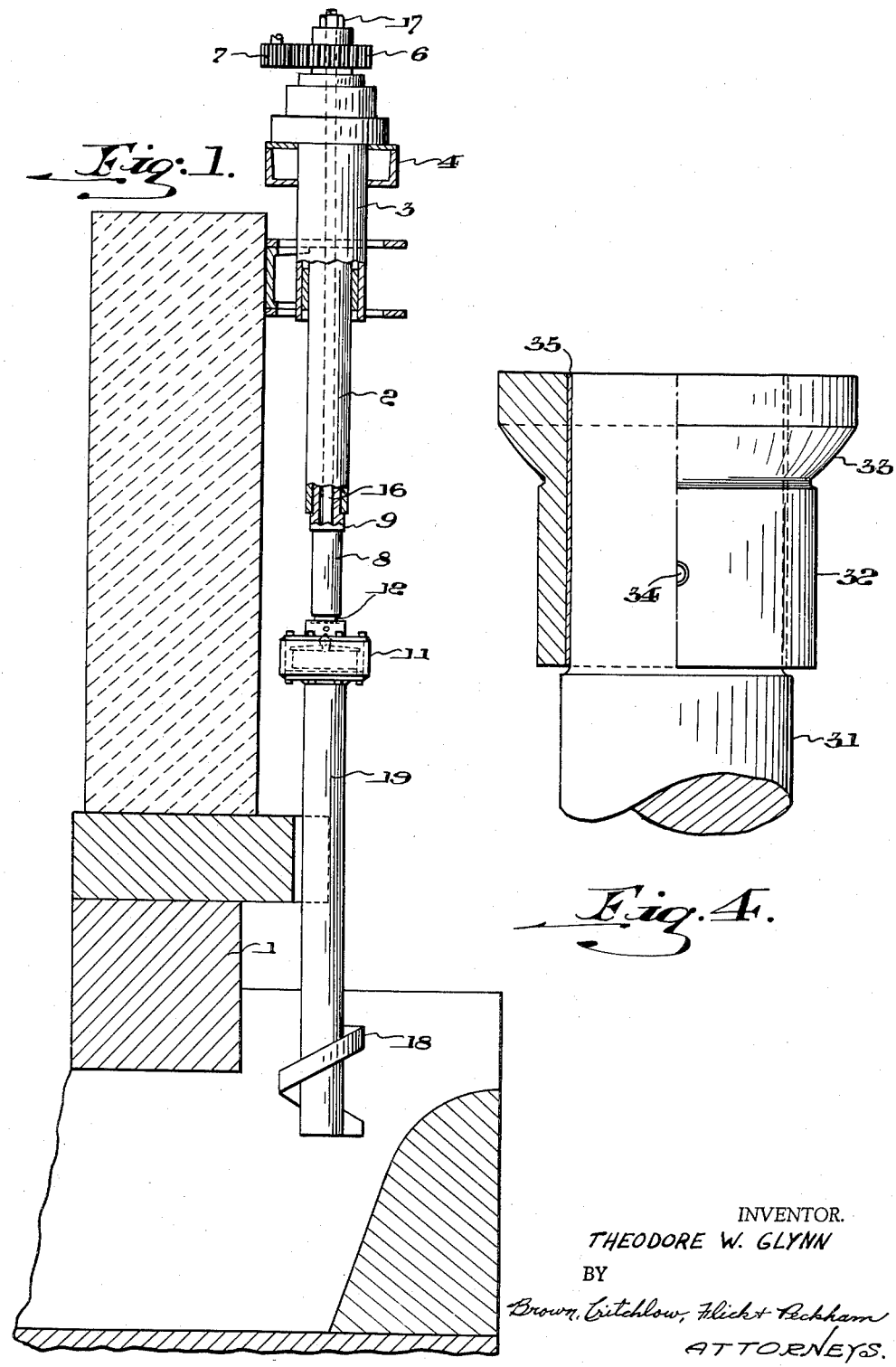

United States Patent Office 2,968,487
Patented Jan. 17, 1961

2,968,487
STIRRING APPARATUS FOR MOLTEN GLASS

Theodore W. Glynn, Kingsport, Tenn., assignor, by mesne assignments, to American-Saint Gobain Corporation, Wilmington, Del., a corporation of Delaware Filed May 21, 1958, Ser. No. 736,816

2 Claims. (Cl. 279—16)

This invention relates to apparatus by which molten glass is stirred in a forehearth, and more particularly to the connection between the stirrer and its drive shaft.

Glass stirrers are made in the form of a rather long shank having a helical thread or worm encircling the lower end to do the actual stirring. The upper end of the stirrer is connected to a vertical drive shaft that rotates the stirrer. Stirrers are made of cast ceramic material that is extremely hard and cannot be machined except at great expense with a diamond grinding wheel. Heretofore, no provision has been made for aligning a stirrer with its drive shaft, so the stirrer frequently has not run true. The lower end of the stirrer, where it dips into the glass, has been eccentric and that imposed a greater strain on the stirrer than if it were turning on its axis. Breakage frequently results. Also, when two adjoining stirrers are both eccentric in opposite directions, they sometimes touch each other as they are turning and thereby cause breakage.

It is among the objects of this invention to provide glass stirring apparatus, in which the stirrer can readily be aligned with the drive shaft to cause the lower end of the stirrer to run true, in which the stirrer can quickly and easily be attached to the drive shaft in correct position, and in which breakage of the stirrer is greatly reduced.

In accordance with this invention a downwardly opening chuck is rigidly connected to the lower end of a vertical drive shaft above a molten glass batch that is to be stirred. The inside of the chuck has a recess in the center of its upper wall. A vertical stirrer has an enlarged upper end disposed in the chuck and provided with a transverse upper surface, on which rests a plate. Secured to the top of the center of the plate is a ball that is seated in the chuck recess. The enlarged end of the stirrer is provided with a lower spherical surface that is concentric with the ball. Encircling the stirrer is a seat that engages the spherical surface. This seat is connected to the chuck in order to support the stirrer and to clamp the ball against the chuck. With this arrangement, the lower end of the stirrer can be held in alignment with the drive shaft so that it will run true.

The invention is illustrated in the accompanying drawings, in which

Fig. 1 is a side view of my stirring apparatus mounted on one end of a glass tank and extending down into the forehearth;

Fig. 2 is an enlarged plan view of the chuck;

Fig. 3 is a vertical section taken on the line III—III of Fig. 2 and showing the chuck connected to the drive shaft and supporting the stirrer; and Fig. 4 is an enlarged side view of the upper end portion of a modified stirrer, shown partly in vertical section.

Referring to Fig. 1 of the drawings, at one end of a glass tank 1 there is a vertical drive shaft that includes a vertical tubular shaft 2 journaled in a tubular housing 3 supported in any suitable manner by a horizontal support 4. The tubular shaft projects above the housing and has a gear 6 mounted on its upper end which is driven by a pinion 7 from any suitable source of power. At the lower end of the tubular shaft there is a long tubular socket member 8 provided with a central collar 9. The portion of the socket member above the collar fits in the tubular shaft and extends up into it about as far as the socket member projects below the shaft. They are connected together in a manner that will be described presently.

A feature of this invention is that a chuck 11 is connected to the lower end of the drive shaft, which includes socket member 8. As shown in Fig. 3, this chuck opens downwardly and has an upper wall encircled by a downwardly extending side wall. Welded to the top of the chuck is an upwardly extending pin 12 that is coaxial with the chuck. The pin is provided with a long taper and fits inside a correspondingly tapered socket 13 in the lower half of the socket member. With this arrangement the chuck is axially aligned with the drive shaft. The upper end of the pin has a threaded axial opening 14 that receives the threaded lower end of a rod 16 extending thereform up through the socket member and tubular shaft 2 and out of the upper end of the latter. As shown in Fig. 1, a nut 17 is welded on the upper end of the rod to permit it to be turned in order to pull the collar 9 of the socket member up tightly against the lower end of shaft 2 and to hold the chuck tightly in place.

The chuck supports a stirrer, which has the usual worm 18 at the lower end of its shank 19, but unlike conventional stirrers its upper end is enlarged. This upper end is disposed inside the chuck and has a transverse upper surface that preferably is flat. The lower surface 21 of the enlarged upper end of the stirrer forms a section of a sphere and is referred to herein as spherical. Encircling this spherical surface in engagement with it is an annular seat 22 that slidingly engages the inside of the lower end of the chuck. Since the enlarged upper end of the stirrer and the worm at its lower end would prevent the seat from being slipped over either end of the stirrer, the seat is divided into two or more, preferably three, sections as indicated in Fig. 2. Each section has openings near its opposite ends through which extend bolts 23 that also extend through the upper wall of the chuck. Nuts 24 are threaded on the lower ends of these bolts to hold the sections of the seat in place so that the seat will support the stirrer by its enlarged upper end.

Another feature of this invention is that the transverse upper surface of the stirrer supports a plate 26, to the center of which an upwardly projecting ball 27 is secured. The ball can be fastened to the plate by providing the center of the plate with an opening 28, in which the ball is seated and then welded to the plate. The ball projects up into a recess 29 in the center of the upper wall of the chuck. Most suitably, the recess is conical. When the bolts 23 are tightened, the seat 22 lifts the upper end of the stirrer and seats the ball tightly against the wall of the recess in the chuck. The spherical surface 21 of the stirrer engaging the seat is concentric with the ball. Thus, any adjustment of the lower end of the stirrer that is necessary to make it run true produces no lateral movement at the ball and insures that the stirrer will continue to run true after it has been clamped in correct position. The friction between the top of the stirrer and plate 26 prevents any lateral movement between those parts.

In setting up this apparatus for operation, it is a simple matter to accurately true and align the stirrer and chuck in the machine shop, after which the stirrer, with the chuck rigidly attached to it, can be preheated and then the tapered pin 12 inserted in the socket 13 of the drive shaft and locked in place by means of the rod 16. The lower end of the stirrer then will run true.

Glass stirrers that are now in use do not have an enlarged ball end. Their upper ends are shaped like the one shown in Fig. 4. To adapt such a stirrer 31 to the chuck described herein, an adapter collar 32 may be rigidly mounted on the upper end of the stirrer. The upper part of the collar is enlarged and is provided with the desired lower spherical surface 33 for engagement with the seat of the chuck 11. To join the collar and stirrer together, the inner diameter of the collar is made a little greater than the diameter of the stirrer to initially form a space between them. The side wall of the collar is provided at 120° intervals with set screws 34 for centering the collar on the stirrer so that the space between them will be substantially uniform all the way around. This space then is filled with a suitable bonding material 35 that will set and securely join the two parts together. One compound that can be used is made from iron filings and sal ammoniac. When this material is wet with water, the iron filings rust and expand, thereby forming a very tight joint that locks the adapter collar to the shank of the stirrer and that will withstand the red heat of operation.

I will be seen that with this invention the stirrer can always be adjusted to run true, without requiring machining. Breakage of stirrers therefore is reduced materially. It also is easy to install or remove a stirrer.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In stirring apparatus for molten glass, a downwardly opening chuck adapted to be rigidly connected to the lower end of a vertical drive shaft, the inside of the chuck having a recess in the center of its upper wall, a vertical stirrer shank having an enlarged upper end disposed in the chuck and provided with a transverse upper surface, a plate resting on said surface, a ball secured to the top of the center of the plate and seated in said recess, said enlarged end being provided with a lower spherical surface concentric with said ball, a seat encircling said shank in engagement with said spherical surface and formed in arcuate sections, and bolts connecting the seat sections to the chuck to support said shank and immovably clamp the ball against the chuck, whereby the lower end of the shank can be held in alignment with the drive shaft.

2. In stirring apparatus for molten glass, a downwardly opening chuck adapted to be rigidly connected to the lower end of a vertical drive shaft and having an upper wall and a side wall, the inside of the chuck having a recess in the center of said upper wall, a vertical stirrer shank having an integral enlarged upper end disposed in the chuck and provided with a transverse upper surface, a plate resting on said surface, a ball secured to the top of the center of the plate and seated in said recess, said enlarged end being provided with a lower spherical surface concentric with said ball, a seat encircling the stirrer in engagement with said spherical surface and formed in arcuate sections, said seat sections being disposed in the chuck in sliding engagement with said side wall, removable vertical bolts extending through the chuck and seat sections, and nuts on the bolts for tightly connecting the chuck and seat together, whereby to support the stirrer and immovably clamp the ball against the upper wall of the chuck.

References Cited in the file of this patent

UNITED STATES PATENTS

| | | |
|---|---|---|
| 1,958,621 | Heppenstall | May 15, 1934 |
| 2,345,299 | Shipley | Mar. 28, 1944 |
| 2,451,683 | Mantle | Oct. 19, 1948 |
| 2,475,385 | Frisio | July 5, 1949 |
| 2,508,459 | Hoffsommer | May 23, 1950 |
| 2,586,079 | Peiler | Feb. 19, 1952 |
| 2,606,051 | Thorn | Aug. 5, 1952 |
| 2,617,672 | Nichols | Nov. 11, 1952 |
| 2,646,297 | Crichton et al. | July 21, 1953 |
| 2,707,621 | Peiler | May 3, 1955 |
| 2,707,640 | Dahms | May 3, 1955 |